(12) United States Patent
Rankin

(10) Patent No.: US 6,249,123 B1
(45) Date of Patent: Jun. 19, 2001

(54) AUTOMATED DETERMINATION OF THE SIZE OF A GAP IN AN ARTICLE OF MANUFACTURE DURING ASSEMBLY OF THE ARTICLE OF MANUFACTURE

(75) Inventor: Brent C. Rankin, Lima, OH (US)

(73) Assignee: Honda of America, Mfg., Inc., Marysville, OH (US)

( * ) Notice: Subject to any disclaimer, the term of this patent is extended or adjusted under 35 U.S.C. 154(b) by 0 days.

(21) Appl. No.: 09/294,946

(22) Filed: Apr. 20, 1999

(51) Int. Cl.⁷ .................................................. F02P 17/00
(52) U.S. Cl. ............................ 324/393; 324/399; 324/402
(58) Field of Search .................... 324/393, 536, 324/122, 102, 399, 402; 327/440, 438; 315/209 T

(56) References Cited

U.S. PATENT DOCUMENTS

| | | |
|---|---|---|
| 3,904,955 | 9/1975 | Katz ........................................ 324/17 |
| 4,024,469 | 5/1977 | Bobulski ................................ 324/16 |
| 5,491,416 * | 2/1996 | Klimstra et al. ...................... 324/393 |
| 5,852,381 * | 12/1998 | Wilmot et al. ........................ 327/440 |

* cited by examiner

Primary Examiner—Safet Metjahic
Assistant Examiner—E P LeRoux
(74) Attorney, Agent, or Firm—Monica H. Choi

(57) ABSTRACT

The present invention is an assembly line testing apparatus and method for automatically determining whether a size of a gap, within at least one component of an article of manufacture, is within an acceptable range, during assembly of the article of manufacture. The present invention uses a microcontroller to control the operation of the assembly line testing apparatus of the present invention such that the size of the gap may be checked in a flexible and reliable manner by repeating the cycle of checking for the size of the gap. The present invention may be used to particular advantage for checking that the size of a spark plug gap within a vehicle engine is within an acceptable range during assembly of the vehicle engine.

26 Claims, 5 Drawing Sheets

AUTOMATED DETERMINATION OF THE SIZE OF A GAP IN AN ARTICLE OF MANUFACTURE DURING ASSEMBLY OF THE ARTICLE OF MANUFACTURE

TECHNICAL FIELD

The present invention relates to testing systems used during assembly of an article of manufacture, such as a vehicle engine, and more particularly to an automated apparatus and method for determining whether a size of a gap formed by two conductive nodes within a component of an article of manufacture is within an acceptable range during assembly of the article of manufacture.

BACKGROUND OF THE INVENTION

The present invention will be described for determining whether a size of a spark plug gap is within an acceptable range during manufacture of a vehicle engine. However, the present invention may be used for determining whether the size of a gap formed by two conductive nodes within any type of component assembled into any type of article of manufacture is within an acceptable range during assembly of the article of manufacture, as would be apparent to one of ordinary skill in the art from the description herein.

Referring to FIG. 1, a spark plug 102 is installed into a vehicle engine 104. FIG. 1 shows a cut-away view of a portion of the vehicle engine 104 having the spark plug 102 installed therein. A spark plug, which is a common component of a combustion engine, has a spark plug gap which electrically bridges for running the combustion engine, as known to one of ordinary skill in the art. Referring to FIG. 1, the spark plug 102 has a first conductive node 106 and a second conductive node 108. The spark plug gap of the spark plug 102 is the space between the first conductive node 106 and the second conductive node 108. The first conductive node 106 is conductively coupled to a top conductive node 107.

In the modem assembly line for manufacture of vehicle engines, a spark plug is installed within a spark plug chamber 110 of the vehicle engine 104 with an automated robotic system. During the assembly of the vehicle engine 104, the first conductive node 106 and the second conductive node 108 at the tip of the spark plug 102 may be accidentally smashed together. Thus, the size of the spark plug gap formed by the first conductive node 106 and the second conductive node 108 may then become undesirably smaller than an acceptable range. When the size of the spark plug gap is smaller than the acceptable range, the vehicle engine 104 may misfire and/or may run rough.

In a typical prior art assembly line for manufacture of vehicle engines, the vehicle engine 104 is not run until a relatively long time after the spark plug 102 has been installed into the vehicle engine 104 since many other components are also assembled into the vehicle engine 104 before the vehicle engine may be run. Thus, the size of the spark plug gap may not be readily checked at or near the location for installing the spark plug within the assembly line for manufacture of the vehicle engine 104. However, corrective measures for dealing with a defective spark plug may be most efficiently performed at or near the location for installing spark plugs within the assembly line for manufacture of the vehicle engine 104.

Thus, a system is desired for checking the size of the spark plug gap 102 that has been installed into a vehicle engine 104 at or near the location for installing spark plugs within the assembly line for manufacture of the vehicle engine 104. Such a system effectively checks for the size of the spark plug gap during assembly of the vehicle engine, and thus does not require a running vehicle engine that is completely assembled.

In contrast, unfortunately, the prior art systems for checking or monitoring the spark plug gap, such as U.S. Pat. No. 3,904,955 to Katz and U.S. Pat. No. 5,491,416 to Klimstra et al. depend on the wiring of a running combustion engine that is completely assembled. Thus, these prior art systems may not be amenable for checking the size of the gap of a spark plug assembled into a vehicle engine at or near the location for installing the spark plug before the vehicle engine has been completely assembled.

U.S. Pat. No. 4,024,469 to Bobulski discloses an apparatus for measuring spark plug gap spacing by applying an AC voltage across the spark plug gap and then measuring the time from the zero-crossing of this AC voltage to the time point of the spark plug firing. However, such an apparatus of the prior art uses predominantly analog components such as numerous differential amplifiers. Thus, this prior art apparatus does not disclose the use of a microcontroller for a more flexible and reliable checking of the size of a spark plug gap during assembly of an article of manufacture.

SUMMARY OF THE INVENTION

Accordingly, the present invention is an assembly line testing apparatus and method for determining whether a size of a gap, within at least one component of an article of manufacture, is within an acceptable range, during assembly of the article of manufacture. Generally, the present invention includes a high voltage pulse circuit, disposed as part of the assembly line testing apparatus, for generating an increasing high voltage to be applied in series with the gap. The gap electrically bridges when the increasing high voltage reaches a firing voltage that depends on the size of the gap. In addition, the present invention includes a step down transformer having a primary winding that is coupled in series with the gap. The step down transformer has a secondary winding with a generated voltage thereon when the gap electrically bridges, and this generated voltage depends on the size of the gap. In the present invention, a microcontroller, operatively coupled to the secondary winding of the step down transformer, inputs a measured signal corresponding to the generated voltage on the secondary winding of the step down transformer to determine whether the size of the gap is within the acceptable range from the measured signal. The acceptable range is programmable within the microcontroller.

In addition, the microcontroller controls the high voltage pulse circuit to repeat a plurality of times a test cycle of applying the increasing high voltage in series with the gap and of determining whether the size of the gap is within the acceptable range from a respective measured signal generated for each of the test cycle. A display of the present invention is coupled to be controlled by the microcontroller to indicate that the size of the gap is within the acceptable range if the gap is determined to be within the acceptable range at least a predetermined number of times from a maximum number of times of repeating the test cycle. The predetermined number and the maximum number are programmable within the microcontroller of the present invention.

In this manner, the testing apparatus of the present invention includes substantially all of the components for checking the size of the gap, apart from the article of manufacture being tested. Thus, the size of the gap may be determined during assembly of the article of manufacture before the article of manufacture is completely assembled.

Furthermore, the microcontroller controls the operation of the assembly line testing apparatus of the present invention. The microcontroller of the present invention is programmed to automatically determine whether the gap size is within an acceptable range in a flexible and reliable manner. For example, the microcontroller has the flexibility of having a readily programmable acceptable range of the size of the gap. In addition, the microcontroller of the present invention checks that the size of the gap is within the acceptable range at least a predetermined number of times from a maximum number of times of repeating the determination of the gap size. Thus, the present invention results in a more reliable determination of whether the gap size is within the acceptable range. In addition, the present invention has the flexibility of having this predetermined number and the maximum number readily programmable into the microcontroller.

The present invention may be used to particular advantage for checking that the size of a spark plug gap within a vehicle engine is within an acceptable range during assembly of the vehicle engine.

These and other features and advantages of the present invention will be better understood by considering the following detailed description of the invention which is presented with the attached drawings.

BRIEF DESCRIPTION OF THE DRAWINGS

The figures referred to herein are drawn for clarity of illustration and are not necessarily drawn to scale. Elements having the same reference number in FIGS. 1, 2, 3, 4, and 5 refer to elements having similar structure and function.

DETAILED DESCRIPTION

The present invention will be described for determining whether a size of a spark plug gap is within an acceptable range during manufacture of a vehicle engine. However, the present invention may be used for determining whether the size of a gap formed by two conductive nodes within any type of component assembled into any type of article of manufacture is within an acceptable range during assembly of the article of manufacture, as would be apparent to one of ordinary skill in the art from the description herein.

Figure 1:
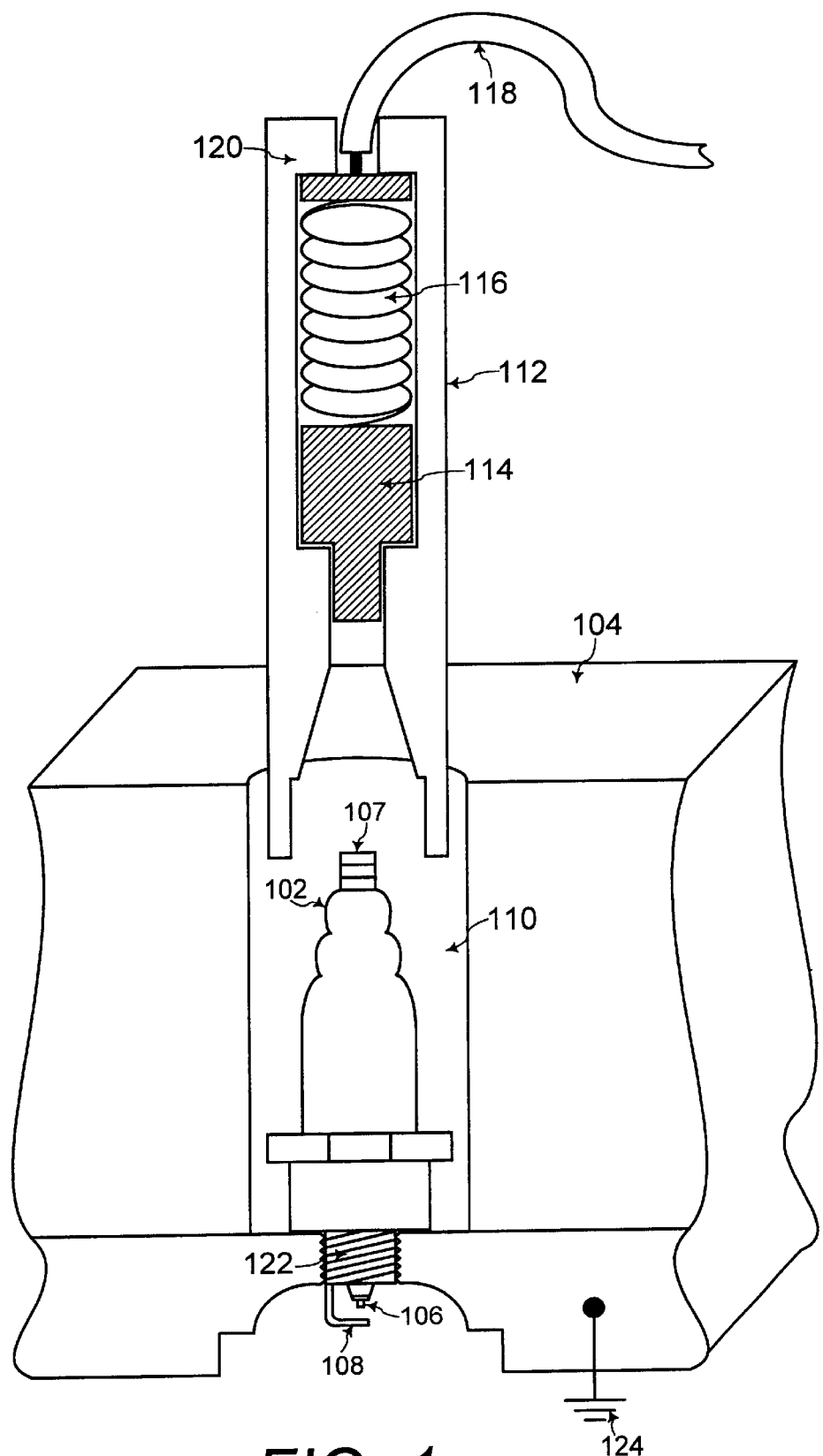
FIG. 1 shows a cut-away view of a spark plug installed within a spark plug chamber of a vehicle engine, and FIG. 1 also shows the cross-sectional view of a probe that connects the two nodes of the spark plug gap to the testing apparatus of the present invention, according to an embodiment of the present invention.

Referring to FIG. 1, the present invention includes a probe 112 for coupling the first conductive node 106 and the second conductive node 108 of the gap of the spark plug 102 to the components for checking the size of the spark plug gap. The probe 112 includes a conductive contact node 114 coupled to a spring 116 which is coupled to a conductive wire 118. A cover 120 is comprised of an electrical insulator material and surrounds these components of the probe 112 such that the probe 112 may be safely handled by an operator within the assembly line.

During use of the probe 112, the probe is lowered down into the spark plug chamber 110 and onto the spark plug 102. As the probe is lowered down onto the spark plug 102, the conductive contact node 114 makes contact with the top conductive node 107 of the spark plug 102 as the compressive force from the spring 116 pushes the conductive contact node 114 down onto the top conductive node 107. The top conductive node 107 and thus the conductive contact node 114 are conductively coupled to the first conductive node 106 of the spark plug 102. The conductive wire 118 couples the first conductive node 106 of the spark plug 102 to the assembly line testing apparatus of the present invention for determining the size of the spark plug gap.

The second conductive node 108 of the spark plug 102 is coupled to a screw thread 122 of the spark plug 102. When the spark plug 102 is installed within the spark plug chamber 110 of the vehicle engine 104, the screw thread 122 is threaded into the vehicle engine, and the screw thread 122 makes conductive contact with the casing of the vehicle engine 104. The casing of the vehicle engine 104 is typically coupled to a ground node 124 as shown in FIG. 1. Thus, the second conductive node 108 of the spark plug 102 is then conductively coupled to the ground node 124.

Figure 2:
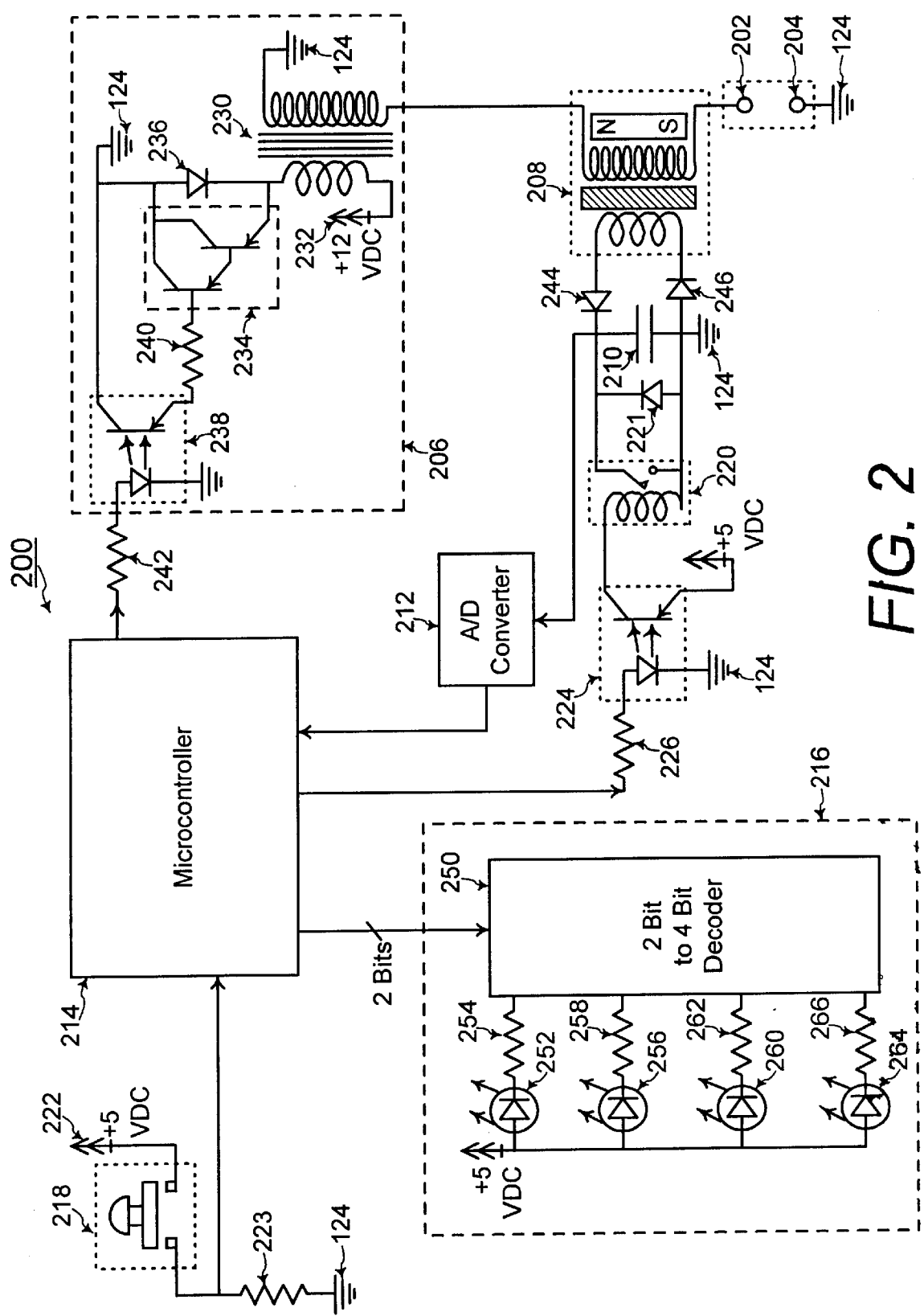
FIG. 2 shows components of an assembly line testing apparatus for determining whether a size of the spark plug gap of FIG. 1 is within an acceptable range during assembly of the vehicle engine, according to an embodiment of the present invention.

Referring to FIG. 2, the first conductive node 106 and the second conductive node 108 of the spark plug 102 are coupled to the circuit of an assembly line testing apparatus 200 of the present invention. A first circuit node 202 is coupled to the conductive wiring 118 from the probe 112 and thus is coupled to the first conductive node 106 of the spark plug 102. A second circuit node 204 is coupled to the ground node 124 and thus is coupled to the second conductive node 108 of the spark plug 102.

The assembly line testing apparatus 200 of the present invention includes a high voltage pulse circuit 206 shown within dashed lines in FIG. 2. The high voltage pulse circuit 206 generates a high voltage to be applied in series with the spark plug gap. The spark plug gap electrically bridges when the increasing high voltage reaches a firing voltage that depends on the size of the spark plug gap.

The assembly line testing apparatus 200 of the present invention also includes a step down transformer 208 shown within dashed lines in FIG. 2. The step down transformer has a primary winding that is coupled in series with the spark plug gap and has a secondary winding. A generated voltage forms on this secondary winding when the spark plug gap electrically bridges, and this generated voltage depends on the size of the spark plug gap. This generated voltage is rectified and stored at a capacitor 210. An analog-to-digital converter 212 is coupled to the capacitor 210 and converts the voltage stored on the capacitor 210 to a digital value. This digital value is a measured signal corresponding to the generated voltage.

The assembly line testing apparatus 200 of the present invention also includes a microcontroller 214. The microcontroller 214 is coupled to the analog-to-digital converter 212 and inputs the measured signal corresponding to the generated voltage to determine whether the size of the spark plug gap is within an acceptable range from the measured signal. The microcontroller 214 controls a display 216 (shown within dashed lines in FIG. 2) to indicate whether the size of the spark plug gap is within the acceptable range.

A start button 218 is coupled to the microcontroller and is depressed by an operator within the assembly line to indicate to the microcontroller that the size of a spark plug gap is ready to be checked. A shorting relay 220 is coupled to the capacitor 210 for shorting the capacitor 210 to zero out the voltage stored on the capacitor 210 and thus to zero out the measured voltage before each new test cycle of checking the size of the spark plug gap.

Figure 3:
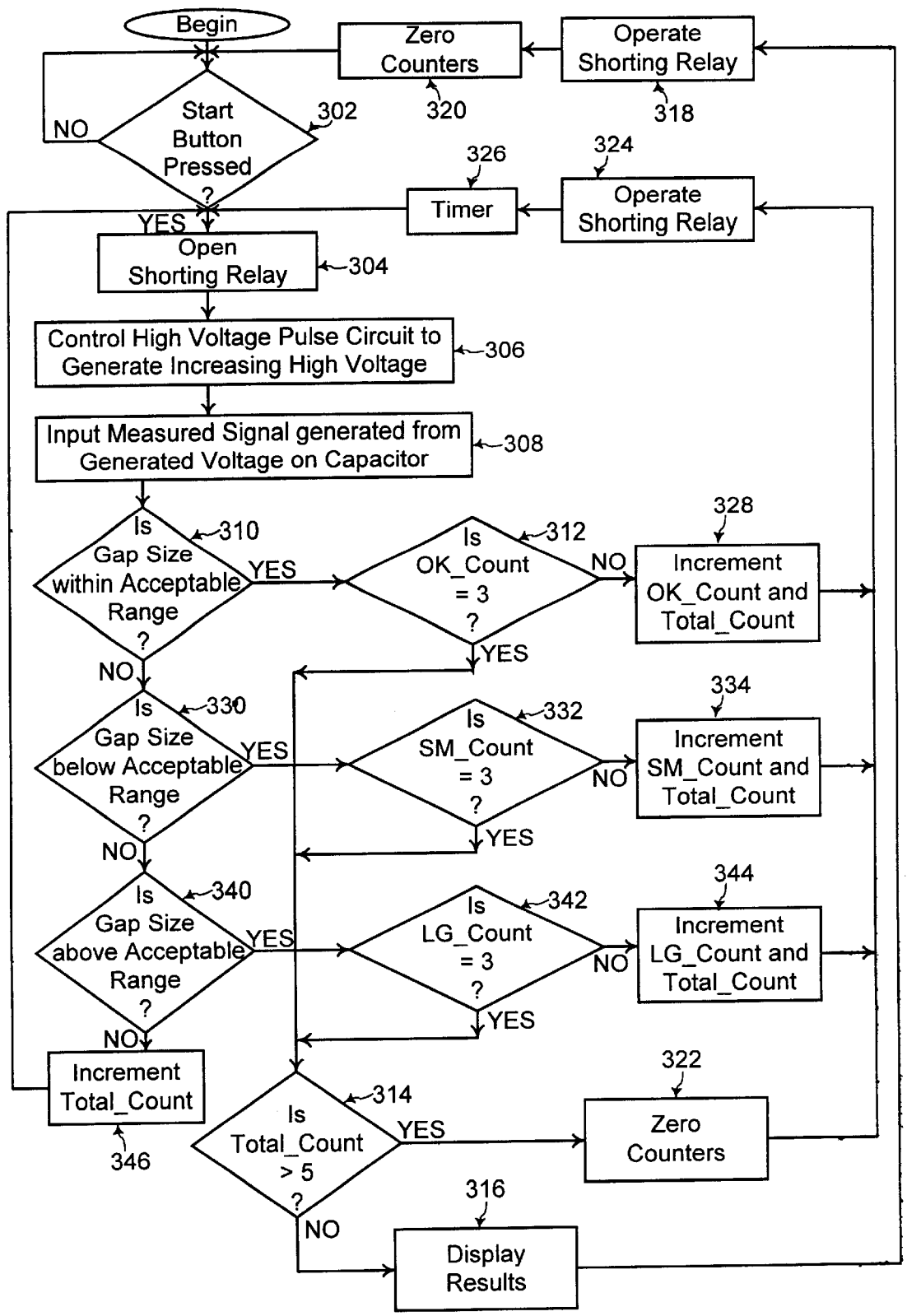
FIG. 3 shows a flowchart of the software programmed within the microcontroller of FIG. 2 for controlling the operation of the assembly line testing apparatus of FIG. 2, according to an embodiment of the present invention.

A detailed description of the operation of the assembly line testing apparatus 200 of the present invention is now described with reference to the flowchart of FIG. 3. The microcontroller 214 controls the operation of the assembly line testing apparatus 200. FIG. 3 shows the flowchart of the software running on the microcontroller 214 for controlling the operation of the assembly line testing apparatus 200. The microcontroller 214 may be any type of programmable data processing device as known to one of ordinary skill in the art, such as PLD's (Programmable Logic Devices) or any other type of such data processors. The microcontroller 214 may then be programmed to operate in accordance with the flowchart of FIG. 3.

Referring to FIGS. 2 and 3, at the beginning of the operation of the assembly line testing apparatus 200 of the present invention, any variables used by the microcontroller are initialized typically by being zeroed. The microcontroller then loops and waits until the start button 218 has been depressed by an operator within the assembly line for manufacturing the vehicle engine 104 having the spark plug 102 (step 302 in FIG. 3). Referring to FIG. 2, when the start button 218 is not depressed, the microcontroller 214 is coupled to the ground node 124 via a first resistor 223. When the start button 218 is depressed, the microcontroller 214 is then coupled instead to a +5V power supply 222 via the depressed start button 218. This coupling to the +5V indicates to the microcontroller 214 that the start button 218 has been depressed. An operator within the assembly line depresses the start button 218 to indicate to the microcontroller 214 that the first circuit node 202 and the second circuit node 204 have been appropriately coupled to the spark plug gap and thus that the spark plug gap size is ready to be checked.

When the start button 218 has been depressed, the microcontroller 214 controls the shorting relay 220 to open (step 304 in FIG. 3). The shorting relay 220 is coupled to the microcontroller 214 through a first opto-isolator device 224. A second resistor 226 coupled between the microcontroller 214 and the first opto-isolator device 224 limits the current flowing through the first opto-isolator device 224. The first opto-isolator device 224 allows an optical coupling of the microcontroller 214 to the shorting relay 220 while electrically isolating any potentially high voltage at the shorting relay 220 from the microcontroller 214 to prevent damage to the microcontroller 214.

The microcontroller 214 controls the shorting relay 220 to close for shorting the capacitor 210 by applying +5V to the first opto-isolator device 224. With such a voltage, the first opto-isolator device 224 turns on to cause current to flow through the magnetic coil of the shorting relay 220. With current flowing through the magnetic coil of the shorting relay 220, the shorting relay 220 closes. Alternatively, the microcontroller 214 controls the shorting relay to open by applying +0V to the first opto-isolator device 224. With such a voltage, the first opto-isolator device 224 turns off to cause substantially zero current to flow through the magnetic coil of the shorting relay 220. With substantially zero current flowing through the magnetic coil of the shorting relay 220, the shorting relay 220 opens.

When the shorting relay 220 is opened, a first diode 221 ensures an open circuit across the capacitor 210 such that the capacitor 210 may store a voltage. When the shorting relay 220 is closed, the capacitor 210 is shorted, and the voltage that has been stored on the capacitor 210 is zeroed.

When the start button 218 has been depressed, the microcontroller 214 controls the shorting relay 220 to open (step 304 in FIG. 3) by applying +0V to the first opto-isolator device 224. When the shorting relay 220 is opened, the microcontroller 214 controls the high voltage pulse circuit 206 to generate an increasing high voltage (step 306 in FIG. 3). Referring to FIG. 2, the high voltage pulse circuit 206 includes a step up transformer 230 having a primary winding that is coupled to a +12V power supply 232. The other node of the primary winding of the step up transformer 230 is coupled to the ground node 124 via a power transistor 234 (shown within dashed lines in FIG. 2) and a second diode 236. The power transistor 234 is coupled to a second opto-isolator device 238 (shown within dashed lines in FIG. 2) via a third resistor 240, and the second opto-isolator device 238 is coupled to the microcontroller 214 via a fourth resistor 242. The third resistor 240 limits the current flowing through the power transistor 234, and the fourth resistor 242 limits the current flowing through the second opto-isolator device 238.

The microcontroller controls the generation of the increasing high voltage to be applied in series with the spark plug gap by applying +5V on the second opto-isolator device 238. Such a voltage causes the second opto-isolator device 238 to turn on. When the second opto-isolator device 238 turns on, the power transistor 234 also turns on. When the second opto-isolator device 238 is turned off, the second diode 236 prevents the +12V from being applied across the primary winding of the step up transformer 230. However, when the second opto-isolator device 238 is turned on, the +12V is applied across the primary winding of the step up transformer 230. With such an application, an increasing high voltage is generated at the secondary winding of the step up transformer 230. The magnitude of this increasing high voltage depends on the ratio of the number of windings in the secondary winding to the number of windings in the primary winding of the step up transformer 230, as known to one of ordinary skill in the art of electronics.

Referring to FIG. 2, the secondary winding of the step up transformer 230 is coupled in series with the spark plug gap, and thus the increasing high voltage is applied in series with the spark plug gap. The magnitude of the increasing high voltage increases with time, and eventually, the spark plug gap fires when the increasing high voltage reaches a firing voltage. This firing voltage depends on the size of the spark plug gap.

The second opto-isolator device 238 allows an optical coupling of the microcontroller 214 to the power transistor 234 while electrically isolating any potentially high voltage at the power transistor 234 from the microcontroller 214 to prevent damage to the microcontroller 214.

Referring to FIG. 2, the primary winding of the step down transformer 208 is coupled in series with the spark plug gap. When the spark plug gap is electrically bridged, the firing voltage forms across the primary winding of the step down transformer 208. The step down transformer 208 has a secondary winding having a generated voltage thereon that corresponds to the firing voltage when the spark plug gap fires. This generated voltage has a magnitude that is proportionally decreased from the magnitude of the firing voltage depending on the ratio of the of the number of windings in the secondary winding to the number of windings in the primary winding of the step down transformer 208, as known to one of ordinary skill in the art of electronics. The decreased magnitude of the generated voltage is more readily measurable by conventional electronic devices.

Referring to FIG. 2, the secondary winding of the step down transformer 208 is coupled to the capacitor 210 via a third diode 244 and a fourth diode 246. The third diode 244 and the fourth diode 246 form a voltage rectifier, and the generated voltage on the secondary winding of the step down transformer 208 is rectified before being stored on the capacitor 210 as a capacitor voltage. Once the capacitor voltage is thus stored on the capacitor 210, the analog-to-digital converter 212 converts the capacitor voltage to a digital value.

This digital value is then a measured signal that the microcontroller 214 inputs (step 308 in FIG. 3) for determining whether the spark plug gap is within an acceptable range. The magnitude of the measured signal which depends on the magnitude of the firing voltage indicates the size of the spark plug gap. Thus, the size of the spark plug gap may be determined by the microcontroller 214 from this measured signal.

Once the size of the spark plug gap is thus determined, the microcontroller compares this size to an acceptable range and determines whether the size of the spark plug gap is within this acceptable range. For a more reliable determination, the microcontroller 214 of the assembly line testing apparatus 200 of the present invention repeats this determination a plurality of times. Each repetition is a test cycle of applying the increasing high voltage in series with the spark plug gap and of determining whether the size of the spark plug gap is within the acceptable range from a respective measured signal generated for each test cycle.

Referring to FIG. 3, after such a test cycle, if the size of the spark plug gap is determined to be within the acceptable range (step 310 of FIG. 3), the value of a variable, OK_Count, is checked (step 312 of FIG. 3). The variable OK_Count indicates the number of times that the size of the spark plug gap has been determined to be within the acceptable range. If the value of OK_Count has reached a predetermined number (such as three in FIG. 3), then the size of the spark plug gap has been determined to be within the acceptable range at least the predetermined number of times of repeating the test cycle.

If the size of the spark plug gap is determined to be within the acceptable range (step 310 of FIG. 3) and if the value of the OK_Count has reached the predetermined number (step 312 of FIG. 3), then the value of a variable, Total_Count, is checked (step 314 of FIG. 3). The variable Total_Count indicates the total number of times that the test cycle has been repeated for a spark plug gap. If the value of OK_Count has reached a predetermined number (such as three in FIG. 3) and if the value of Total_Count has not yet reached a maximum number (such as 5 in FIG. 3), then the microcontroller 214 is reliably assured that the size of the spark plug gap is within the acceptable range and displays this result at the display 216 (step 316 in FIG. 3).

After this result has been displayed, the microcontroller 214 controls the shorting relay 220 to short the capacitor 210 (step 318 in FIG. 3), and the microcontroller 214 zeroes out any variables used for counting events such as OK_Count and Total_Count (step 320 of FIG. 3). The microcontroller 214 then returns to looping until the start button 218 is depressed again for checking the size of another spark plug gap (step 302 of FIG. 3).

If the size of the spark plug gap is determined to be within the acceptable range (step 310 of FIG. 3) and if the value of OK_Count has reached a predetermined number (such as three in FIG. 3) and if the value of Total_Count has already reached the maximum number (such as 5 in FIG. 3), then the microcontroller 214 determines that too many test cycles have been performed on the spark plug gap. The microcontroller 214 decides that this determination that the size of the spark plug gap is within the acceptable range is not a reliable determination since too many test cycles have been performed on the spark plug gap. The microcontroller 214 then zeroes any variables used for counting events such as OK_Count and Total_Count (step 322 of FIG. 3) and controls the shorting relay 220 to short the capacitor 210 (step 324 in FIG. 3) for a predetermined time period (step 326 in FIG. 3) before going back to repeating the whole process of checking for the size of that spark plug gap (step 304 in FIG. 3).

If the size of the spark plug gap is determined to be within the acceptable range (step 310 of FIG. 3) and if the value of the OK_Count has not yet reached the predetermined number (three in the case of FIG. 3), then the microcontroller 214 determines this result is not yet reliable enough. The microcontroller 214 increments the variable OK_Count and the variable Total_Count (step 328 of FIG. 3) and controls the shorting relay 220 to short the capacitor 210 (step 324 in FIG. 3) for a predetermined time period (step 326 in FIG. 3) before going back to repeating another test cycle for checking the size of that spark plug gap (step 304 in FIG. 3).

Referring to FIG. 3, if the size of the spark plug gap is determined to be below the acceptable range (step 330 of FIG. 3), the value of a variable, SM_Count, is checked (step 332 of FIG. 3). The variable SM_Count indicates the number of times that the size of the spark plug gap has been determined to be below the acceptable range. If the value of SM_Count has reached a predetermined number (such as three in FIG. 3), then the size of the spark plug gap has been determined to be below the acceptable range at least the predetermined number of times of repeating the test cycle.

If the size of the spark plug gap is determined to be below the acceptable range (step 330 of FIG. 3) and if the value of the SM_Count has reached the predetermined number (step 332 of FIG. 3), then the value of a variable, Total_Count, is checked (step 314 of FIG. 3). The variable Total_Count indicates the total number of times that the test cycle has been repeated for a spark plug gap. If the value of SM_Count has reached a predetermined number (such as three in FIG. 3) and if the value of Total_Count has not yet reached a maximum number (such as 5 in FIG. 3), then the microcontroller 214 is reliably assured that the size of the spark plug gap is below the acceptable range and displays this result at the display 216 (step 316 in FIG. 3).

After this result has been displayed, the microcontroller 214 controls the shorting relay 220 to short the capacitor 210 (step 318 in FIG. 3), and the microcontroller 214 zeroes out any variables used for counting events such as OK_Count, SM_Count, and Total_Count (step 320 of FIG. 3). The microcontroller 214 then returns to looping until the start button 218 is depressed again for checking the size of another spark plug (step 302 of FIG. 3).

If the size of the spark plug gap is determined to be below the acceptable range (step 330 of FIG. 3) and if the value of SM_Count has reached a predetermined number (such as three in FIG. 3) and if the value of Total_Count has already reached the maximum number (such as 5 in FIG. 3), then the microcontroller 214 determines that too many test cycles have been performed on the spark plug gap. The microcontroller 214 decides that this determination that the size of the spark plug gap is below the acceptable range is not a reliable determination since too many test cycles have been performed on the spark plug gap. The microcontroller 214 then zeroes any variables used for counting events such as OK_Count, SM_Count, and Total_Count (step 322 of FIG. 3) and controls the shorting relay 220 to short the capacitor 210 (step 324 in FIG. 3) for a predetermined time period (step 326 in FIG. 3) before going back to repeating the whole process of checking for the size of the spark plug gap (step 304 in FIG. 3).

If the size of the spark plug gap is determined to be below the acceptable range (step 330 of FIG. 3) and if the value of the SM_Count has not yet reached the predetermined number (three in the case of FIG. 3), then the microcontroller 214 determines this result is not yet reliable enough. The microcontroller 214 increments the variable SM_Count and the variable Total_Count (step 334 of FIG. 3) and controls the shorting relay 220 to short the capacitor 210 (step 324 in FIG. 3) for a predetermined time period (step 326 in FIG. 3) before going back to repeating another test cycle for checking the size of that spark plug gap (step 304 in FIG. 3).

Referring to FIG. 3, if the size of the spark plug gap is determined to be above the acceptable range (step 340 of FIG. 3), the value of a variable, LG_Count, is checked (step 342 of FIG. 3). The variable LG_Count indicates the number of times that the size of the spark plug gap has been determined to be above the acceptable range. If the value of LG_Count has reached a predetermined number (such as three in FIG. 3), then the size of the spark plug gap has been determined to be above the acceptable range at least the predetermined number of times of repeating the test cycle.

If the size of the spark plug gap is determined to be above the acceptable range (step 340 of FIG. 3) and if the value of the LG_Count has reached the predetermined number (step 312 of FIG. 3), then the value of the variable, Total_Count, is checked (step 314 of FIG. 3). The variable Total_Count indicates the total number of times that the test cycle has been repeated for a spark plug gap. If the value of LG_Count has reached a predetermined number (such as three in FIG. 3) and if the value of Total_Count has not yet reached a maximum number (such as 5 in FIG. 3), then the microcontroller 214 is reliably assured that the size of the spark plug gap is above the acceptable range and displays this result at the display 216 (step 316 in FIG. 3).

After this result has been displayed, the microcontroller 214 controls the shorting relay 220 to short the capacitor 210 (step 318 in FIG. 3), and the microcontroller 214 zeroes out any variables used for counting events such as OK_Count, SM_Count, LG_Count, and Total_Count (step 320 of FIG. 3). The microcontroller 214 then returns to looping until the start button 218 is depressed again for checking the size of another spark plug (step 302 of FIG. 3).

If the size of the spark plug gap is determined to be above the acceptable range (step 340 of FIG. 3) and if the value of LG_Count has reached a predetermined number (such as three in FIG. 3) and if the value of Total_Count has already reached the maximum number (such as 5 in FIG. 3), then the microcontroller 214 determines that too many test cycles have been performed on the spark plug gap. The microcontroller 214 decides that this determination that the size of the spark plug gap is above the acceptable range is not a reliable determination since too many test cycles have been performed on the spark plug gap. The microcontroller 214 then zeroes any variables used for counting events such as OK_Count, SM_Count, LG_Count, and Total_Count (step 322 of FIG. 3) and controls the shorting relay 220 to short the capacitor 210 (step 324 in FIG. 3) for a predetermined time period (step 326 in FIG. 3) before going back to repeating the whole process of checking for the size of the spark plug gap (step 304 in FIG. 3).

If the size of the spark plug gap is determined to be above the acceptable range (step 340 of FIG. 3) and if the value of the LG_Count has not yet reached the predetermined number (three in the case of FIG. 3), then the microcontroller 214 determines this result is not yet reliable enough. The microcontroller 214 increments the variable LG_Count and the variable Total_Count (step 344 of FIG. 3) and controls the shorting relay 220 to short the capacitor 210 (step 324 in FIG. 3) for a predetermined time period (step 326 in FIG. 3) before going back to repeating another test cycle for checking the size of that spark plug gap (step 304 in FIG. 3).

If the size of the spark plug gap is determined to be not within the acceptable range, and not below the acceptable range, and not above the acceptable range, then the microcontroller 214 determines that an error occurred and increments the variable Total_Count (step 346 in FIG. 3) before going back to repeating another test cycle for checking the size of that spark plug gap (step 304 in FIG. 3).

Referring to FIG. 2, the microcontroller 214 controls the display 216 with two control bits. The display 216 includes a 2-bit-to-4-bit decoder 250 having the 2 bit inputs from the microcontroller 214. The display 216 also includes a first LED (Light Emitting Diode) 252 coupled to a first output of the 2-bit-to-4-bit decoder 250 via a fifth resistor 254, a second LED (Light Emitting Diode) 256 coupled to a second output of the 2-bit-to-4-bit decoder 250 via a sixth resistor 258, a third LED (Light Emitting Diode) 260 coupled to a third output of the 2-bit-to-4-bit decoder 250 via a seventh resistor 262, and a fourth LED (Light Emitting Diode) 264 coupled to a fourth output of the 2-bit-to-4-bit decoder 250 via an eighth resistor 266.

The microcontroller 214 sends one of four possible combinations of two bits to the 2-bit-to-4-bit decoder 250 to control one of the LED's 252, 256, 260, and 264 to light. The microcontroller 214 controls the first LED 252 to light when the microcontroller determines that the size of spark plug gap is below the acceptable range at least the predetermined number of times from the maximum number of times of repeating the test cycle, as described herein with respect to FIG. 3. The microcontroller 214 controls the second LED to light when the microcontroller determines that the size of the spark plug gap is within the acceptable range at least the predetermined number of times from the maximum number of times of repeating the test cycle, as described herein with respect to FIG. 3. The microcontroller 214 controls the third LED to light when the microcontroller determines that the size of the spark plug gap is above the acceptable range at least the predetermined number of times from the maximum number of times of repeating the test cycle, as described herein with reference to FIG. 3. The microcontroller 214 controls the fourth LED to light when the capacitor 210 has been zeroed by the shorting relay 220 to indicate that the assembly line testing apparatus 200 is ready to begin another testing cycle for a spark plug or to begin checking the size of the gap of another spark plug.

In this manner, the assembly line testing apparatus 200 of the present invention checks for the size of the gap of the spark plug 102 assembled into the vehicle engine 104 during assembly of the vehicle engine. The assembly line testing apparatus 200 of the present invention does not depend on the vehicle engine running, and thus, the size of the spark plug gap 102 may be checked at or near the location for installing spark plugs within the assembly line for manufacture of the vehicle engine 104 before the vehicle engine 104 is completely assembled.

In addition, by using the microcontroller 214, the assembly line testing apparatus 200 of the present invention checks for the size of the gap of the spark plug 102 assembled into the vehicle engine 104 during assembly of the vehicle engine 104 in a reliable and flexible manner. The use of the microcontroller 214 provides flexibility because the acceptable range which is compared with the size of the spark plug gap is readily programmable within the microcontroller 214. In addition, the predetermined number and the maximum number are programmable for repeating the test cycle of applying the increasing high voltage in series with the gap and of determining whether the size of the gap is within the acceptable range from a respective measured signal generated for each of the test cycle, as described herein with respect to FIG. 3. Furthermore, because the microcontroller 214 determines that the size of the spark plug gap is within the acceptable range, or is below the acceptable range, or is above the acceptable range, at least a predetermined number of times from a maximum number of times of repeating the test cycle as described herein with respect to FIG. 3, such a determination is more reliable.

The foregoing is by way of example only and is not intended to be limiting. For example, the present invention has been described for determining whether a size of a spark plug gap is within an acceptable range during manufacture of a vehicle engine. However, the present invention may be used for determining whether the size of a gap formed by two conductive nodes within any type of component assembled into any type of article of manufacture is within an acceptable range during assembly of the article of manufacture, as would be apparent to one of ordinary skill in the art from the description herein.

In addition, the probe 112 of FIG. 1 for coupling the first conductive node 106 and the second conductive node 108 of the spark plug gap to the assembly line testing apparatus 200 is by way of example only, and any other type of probe for coupling the first conductive node 106 and the second conductive node 108 of the spark plug gap to the assembly line testing apparatus 200 may be used with the present invention, as would be apparent to one of ordinary skill in the art from the description herein.

Figure 4:
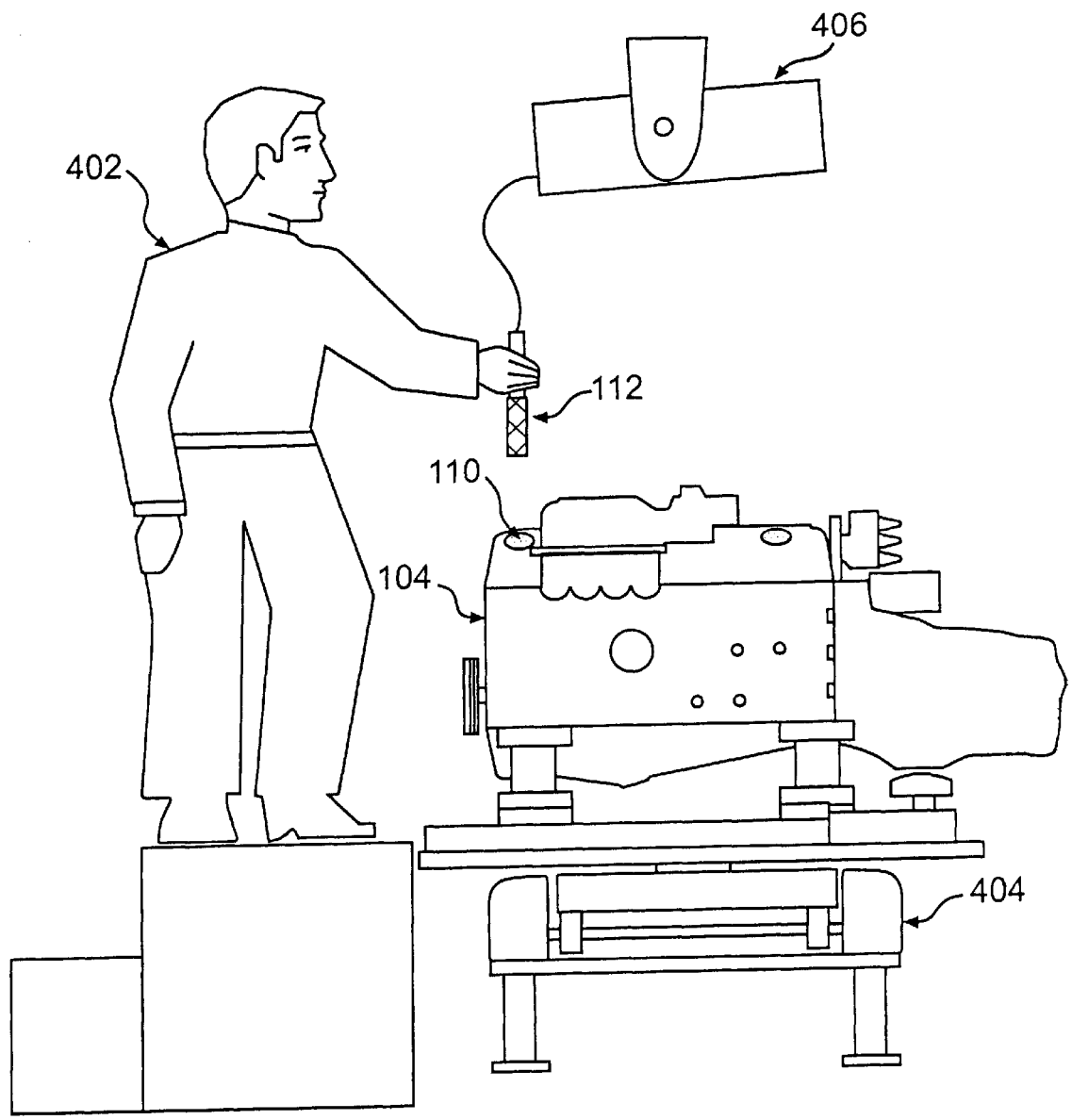
FIG. 4 illustrates manual use of the probe of FIG. 1 in the assembly line for the manufacture of the vehicle engine having the spark plug gap to be tested.

Furthermore, the probe 112 may be handled by an operator within the assembly line to manually couple the first conductive node 106 and the second conductive node 108 of the spark plug gap to the assembly line testing apparatus 200. Referring to FIGS. 1, 2, and 4, an operator 402 handles the probe 112 to manually couple the first conductive node 106 and the second conductive node 108 of the spark plug within the spark plug chamber 110 of the vehicle engine 104 to the assembly line testing apparatus 200. Vehicle engines move down a conveyor 404 as the vehicle engines are assembled. The assembly line testing apparatus 200 of the present invention may be disposed within a support structure 406 at or near the location for installing spark plugs into the vehicle engine.

Figure 5:
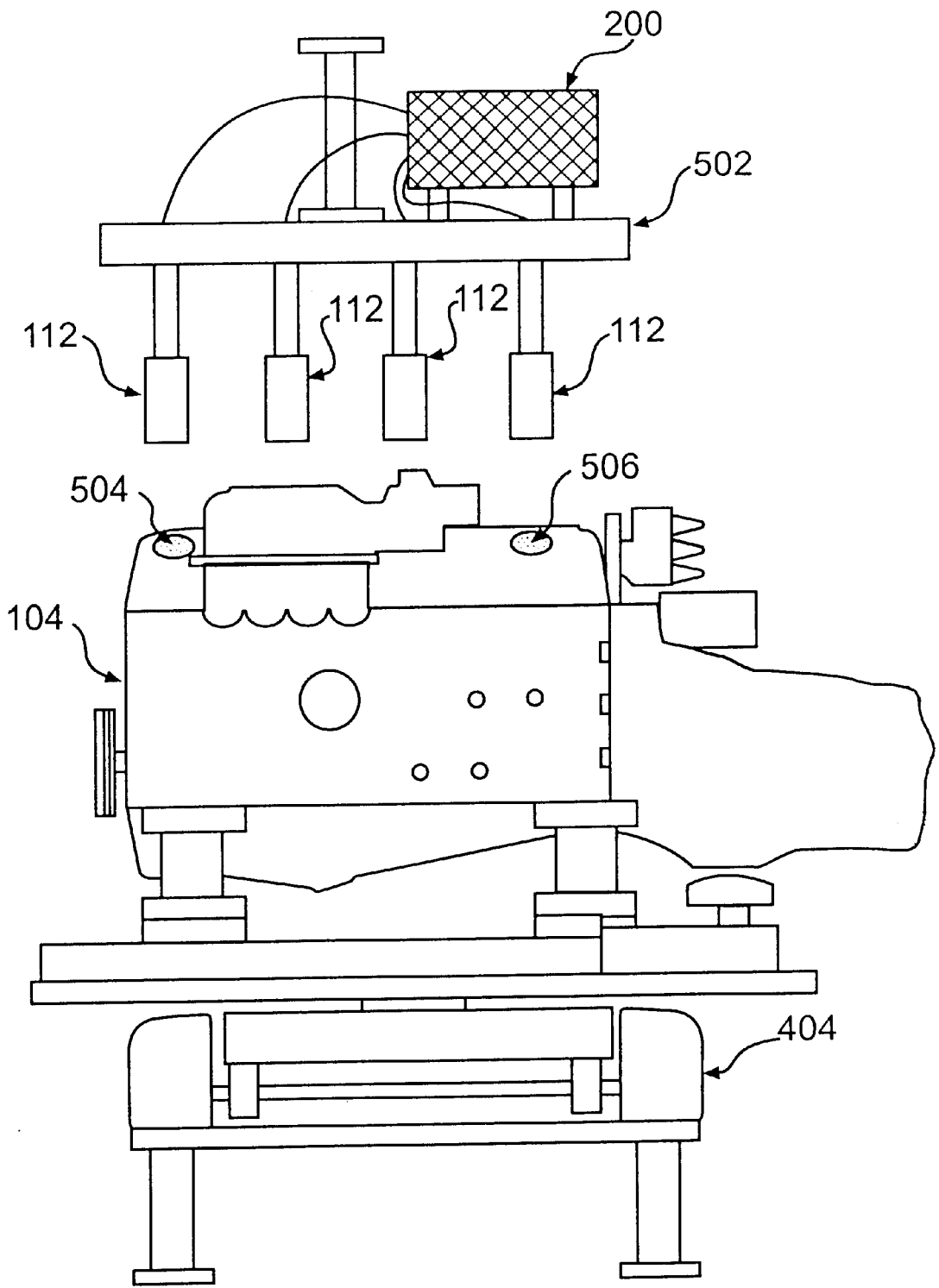
FIG. 5 illustrates automated use of a plurality of probes of FIG. 1 in the assembly line for the manufacture of the vehicle engine having a plurality of spark plug gaps to be tested.

Alternatively, the probe 112 may be robotically handled within the assembly line to automatically couple the first conductive node 106 and the second conductive node 108 of the spark plug gap to the assembly line testing apparatus 200. Referring to FIGS. 1, 2, and 5, a plurality of probes 112 are disposed on a gang head 502. The position of the gang head 502 is controlled robotically to automatically couple the first conductive node 106 and the second conductive node 108 of any spark plugs within a plurality of spark plug chambers (including 504 and 506 shown in FIG. 5) of the vehicle engine 104 to the assembly line testing apparatus 200.

The assembly line testing apparatus 200 of the present invention may be disposed on the gang head 502. The gang head 502 may be disposed at or near the location for installing spark plugs into the vehicle engine 104. In this case, a respective one of the assembly line testing apparatus 200 of the present invention on the gang head 502 may be used for each of the plurality of spark plugs. Alternatively, a multiplexer may be used to successively test each of the plurality of spark plugs with one of the assembly line testing apparatus 200 of the present invention on the gang head 502.

The present invention is limited only as defined in the following claims and equivalents thereof.

I claim:

1. An assembly line testing apparatus for determining whether a size of a gap, within at least one component of an article of manufacture, is within an acceptable range, during assembly of said article of manufacture, the assembly line testing apparatus comprising:

a probe forming a part of said assembly line testing apparatus and coupling a high voltage pulse circuit also forming a part of said assembly line testing apparatus to a first node of said gap, said high voltage pulse circuit generating an increasing high voltage to be applied in series with said gap, said gap electrically bridging when said increasing high voltage reaches a firing voltage that depends on said size of said gap;

a step down transformer having a primary winding that is coupled in series with said gap and having a secondary winding with a generated voltage thereon when said gap electrically bridges, said generated voltage depending on said size of said gap;

a microcontroller, operatively coupled to said secondary winding of said step down transformer, for inputting a measured signal corresponding to said generated voltage on said secondary winding of said step down transformer, said microcontroller determining whether said size of said gap is within said acceptable range from said measured signal;

and wherein said acceptable range is programmable within said microcontroller;

and wherein said microcontroller controls said high voltage pulse circuit to repeat a plurality of times a cycle of applying said increasing high voltage in series with said gap and of determining whether said size of said gap is within said acceptable range from a respective measured signal generated for each of said cycle; and a display coupled to be controlled by said microcontroller to indicate that said size of said gap is within said acceptable range if said gap is determined to be within said acceptable range at least a predetermined number of times from a maximum number of times of repeating said cycle;

and wherein said predetermined number and said maximum number are programmable within said microcontroller.

2. The assembly line testing apparatus of claim 1, wherein said high voltage pulse circuit further comprises:

a power supply;

an opto-isolator switch coupled to said microcontroller, said microcontroller controlling said opto-isolator switch to turn on and turn off;

a power transistor, coupled to said power supply and said opto-isolator switch, said power transistor turning on when said opto-isolator switch is turned on; and a step up transformer having a primary winding coupled to said power supply via said power transistor when said power transistor turns on, and said step up transformer having a secondary winding coupled in series with said gap, wherein said increasing high voltage is generated at said secondary winding of said step up transformer when said primary winding of said step up transformer is coupled to said power supply.

3. The assembly line testing apparatus of claim 1, further comprising:

a shorting relay, operatively coupled to said microcontroller and said secondary winding of said step down transformer, wherein said microcontroller controls said shorting relay to zero said measured signal before each of said cycle.

4. The assembly line testing apparatus of claim 3, wherein said display has a LED that is controlled by said microcontroller to light when said measured signal has been zeroed by said shorting relay to indicate that said assembly line testing apparatus is ready to begin checking said size of said gap.

5. The assembly line testing apparatus of claim 1, further comprising:

a capacitor, coupled to said secondary winding of said step down transformer via a voltage rectifier, for storing a capacitor voltage that is said generated voltage rectified by said voltage rectifier; and an analog to digital converter coupled to said capacitor for converting said capacitor voltage to a digital value to generate said measured signal that is input by said microcontroller.

6. The assembly line testing apparatus of claim 5, further comprising:

a shorting relay, coupled to said microcontroller and said capacitor, wherein said microcontroller controls said shorting relay to short said capacitor before each of said cycle.

7. The assembly line testing apparatus of claim 1, wherein said display has a first LED that is controlled by said microcontroller to light when said microcontroller determines that said size of said gap is below said acceptable range at least said predetermined number of times from said maximum number of times of repeating said cycle, and wherein said display has a second LED that is controlled by said microcontroller to light when said microcontroller determines that said size of said gap is within said acceptable range at least said predetermined number of times from said maximum number of times of repeating said cycle.

8. The assembly line testing apparatus of claim 7, wherein said display has a third LED that is controlled by said microcontroller to light when said microcontroller determines that said size of said gap is above said acceptable range at least said predetermined number of times from said maximum number of times of repeating said cycle.

9. The assembly line testing apparatus of claim 1, further comprising:

a start button, coupled to said microcontroller, that is pressed by an operator of an assembly line for assembling said article of manufacture to indicate to the microcontroller that said operator has coupled said assembly line testing apparatus to said gap within said at least one component that is assembled into said article of manufacture.

10. The assembly line testing apparatus of claim 1, wherein said article of manufacture is a vehicle engine, and wherein said gap is for a spark plug gap assembled into said vehicle engine during assembly of said vehicle engine.

11. An assembly line testing apparatus for determining whether a size of a spark plug gap, assembled into a vehicle engine, is within an acceptable range, during assembly of said vehicle engine, the apparatus comprising:

a high voltage pulse circuit, disposed as part of said assembly line testing apparatus, for generating an increasing high voltage to be applied in series with said spark plug gap, said spark plug gap electrically bridging when said increasing high voltage reaches a firing voltage that depends on said size of said spark plug gap, wherein said high voltage pulse circuit further comprises:

a power supply;

an opto-isolator switch that turns on and turns off;

a power transistor, coupled to said power supply and said opto-isolator switch, said power transistor turning on when said opto-isolator switch turns on; and a step up transformer having a primary winding coupled to said power supply via said power transistor when said power transistor turns on, and said step up transformer having a secondary winding coupled in series with said spark plug gap, wherein said increasing high voltage is generated at said secondary winding of said step up transformer when said primary winding of said step up transformer is coupled to said power supply;

a step down transformer having a primary winding that is coupled in series with said spark plug gap and having a secondary winding with a generated voltage thereon when said spark plug gap electrically bridges, said generated voltage depending on said size of said spark plug gap;

a microcontroller, operatively coupled to said opto-isolator switch for controlling the turning on of the opto-isolator switch to generate said increasing high voltage, and said microcontroller being operatively coupled to said secondary winding of said step down transformer for inputting a measured signal corresponding to said generated voltage on said secondary winding of said step down transformer, said microcontroller determining whether said size of said spark plug gap is within said acceptable range from said measured signal;

and wherein said acceptable range is programmable within said microcontroller;

and wherein said microcontroller controls said high voltage pulse circuit to repeat a plurality of times a cycle of applying said increasing high voltage in series with said spark plug gap and of determining whether said size of said spark plug gap is within said acceptable range from a respective measured signal for each of said cycle;

a display coupled to be controlled by said microcontroller to indicate that said size of said spark plug gap is within said acceptable range if said spark plug gap is determined to be within said acceptable range at least a predetermined number of times from a maximum number of times of repeating said cycle;

and wherein said predetermined number and said maximum number are programmable within said microcontroller;

a capacitor, coupled to said secondary winding of said step down transformer via a voltage rectifier, for storing a capacitor voltage that is said generated voltage that is rectified by said voltage rectifier;

an analog to digital converter coupled to said capacitor for converting said capacitor voltage to a digital value to generate said measured signal that is input by said microcontroller;

a shorting relay, coupled to said microcontroller and said capacitor, wherein said microcontroller controls said shorting relay to short said capacitor before each of said cycle;

wherein said display has a first LED that is controlled by the microcontroller to light when said microcontroller determines that said size of said gap is below said acceptable range at least said predetermined number of times from said maximum number of times of repeating said cycle;

and wherein said display has a second LED that is controlled by the microcontroller to light when said microcontroller determines that said size of said gap is within said acceptable range at least said predetermined number of times from said maximum number of times of repeating said cycle;

and wherein said display has a third LED that is controlled by the microcontroller to light when said microcontroller determines that said size of said gap is above said acceptable range at least said predetermined number of times from said maximum number of times of repeating said cycle;

and wherein said display has a fourth LED that is controlled by the microcontroller to light when said measured signal has been zeroed by said shorting relay to indicate that said assembly line testing apparatus is ready to begin checking said size of said gap; and a start button, coupled to said microcontroller, that is pressed by an operator of an assembly line for assembling said vehicle engine to indicate to the microcontroller that said operator has coupled said assembly line testing apparatus to said spark plug gap.

12. A method for determining whether a size of a gap, within at least one component of an article of manufacture, is within an acceptable range, during assembly of said article of manufacture, the method including the steps of:

generating an increasing high voltage to be applied in series with said gap, said gap electrically bridging when said increasing high voltage reaches a firing voltage that depends on said size of said gap;

forming a generated voltage on a secondary winding of a step down transformer when said gap electrically bridges, said step down transformer having a primary winding that is coupled in series with said gap, and wherein said generated voltage depends on said size of said gap;

inputting by a microcontroller a measured signal corresponding to said generated voltage on said secondary winding of said step down transformer;

determining by said microcontroller whether said size of said gap is within said acceptable range from said measured signal;

programming said acceptable range into said microcontroller;

repeating a plurality of times a cycle of applying said increasing high voltage in series with said gap and of determining whether said size of said gap is within said acceptable range from a respective measured signal generated for each of said cycle;

controlling a display by said microcontroller to indicate that said size of said gap is within said acceptable range if said gap is determined to be within said acceptable range at least a predetermined number of times from a maximum number of times of repeating said cycle; and programming said predetermined number and said maximum number into said microcontroller.

13. The method of claim 12, further including the step of:
controlling by said microcontroller a shorting relay to zero out said measured signal before each of said cycle.

14. The method of claim 13, further including the step of:
controlling by said microcontroller a LED to light when said measured signal has been zeroed by said shorting relay to indicate that checking of said size of said gap is ready to begin.

15. The method of claim 12, further including the step of:
storing at a capacitor a capacitor voltage that is said generated voltage rectified by a voltage rectifier; and
converting said capacitor voltage to a digital value to generate said measured signal that is input by said microcontroller.

16. The method of claim 15, further including the step of:
controlling by said microcontroller a first LED to light when said microcontroller determines that said size of said gap is below said acceptable range at least said predetermined number of times from said maximum number of times of repeating said cycle; and
controlling by said microcontroller a second LED to light when said microcontroller determines that said size of said gap is within said acceptable range at least said predetermined number of times from said maximum number of times of repeating said cycle.

17. The method of claim 16, further including the step of:
controlling by said microcontroller a third LED to light when said microcontroller determines that said size of said gap is above said acceptable range at least said predetermined number of times from said maximum number of times of repeating said cycle.

18. The method claim 12, further including the step of:
pressing a start button by an operator of an assembly line for assembling said article of manufacture to indicate to said microcontroller that said gap within said at least one component is ready for testing.

19. The method of claim 12, wherein said article of manufacture is a vehicle engine, and wherein said gap is for a spark plug gap assembled into said vehicle engine during assembly of said vehicle engine.

20. An assembly line testing apparatus for determining whether a size of a gap, within at least one component of an article of manufacture, is within an acceptable range, during assembly of said article of manufacture, the assembly line testing apparatus comprising:

a probe forming a part of said assembly line testing apparatus and coupling a high voltage pulse circuit also forming a part of said assembly line testing apparatus for generating an increasing high voltage to be applied in series with said gap to a first node of said gap, said gap electrically bridging when said increasing high voltage reaches a firing voltage that depends on said size of said gap;

means for forming a generated voltage from said firing voltage, said generated voltage having a relatively lower magnitude that is readily measurable, and said generated voltage depending on said size of said gap;

means for determining whether said size of said gap is within said acceptable range from a measured signal that corresponds to said generated voltage;

means for programming said acceptable range;

means for repeating a plurality of times a cycle of applying said increasing high voltage in series with said gap and of determining whether said size of said gap is within said acceptable range from a respective measured signal generated for each of said cycle;

means for indicating that said size of said gap is within said acceptable range if said gap is determined to be within said acceptable range at least a predetermined number of times from a maximum number of times of repeating said cycle; and means for programming said predetermined number and said maximum number.

21. The assembly line testing apparatus of claim 20, further comprising:

means for zeroing said measured signal before each of said cycle.

22. The assembly line testing apparatus of claim 20, further comprising:

means for controlling a LED to light when said measured signal has been zeroed by said shorting relay to indicate that checking of said size of said gap is ready to begin.

23. The assembly line testing apparatus of claim 20, further comprising:

means for controlling a first LED to light when said size of said gap is determined to be below said acceptable range at least said predetermined number of times from said maximum number of times of repeating said cycle; and means for controlling a second LED to light when said size of said gap is determined to be within said acceptable range at least said predetermined number of times from said maximum number of times of repeating said cycle.

24. The assembly line testing apparatus of claim 23, further comprising:

means for controlling a third LED to light when said size of said gap is determined to be above said acceptable range at least said predetermined number of times from said maximum number of times of repeating said cycle.

25. The assembly line testing apparatus of claim 20, further comprising:

means for indicating by an operator of an assembly line for assembling said article of manufacture that said gap within said at least one component is ready for testing.

26. The assembly line testing apparatus of claim 20, wherein said article of manufacture is a vehicle engine, and wherein said gap is for a spark plug gap assembled into said vehicle engine during assembly of said vehicle engine.

* * * * *